(12) United States Patent
Wu et al.

(10) Patent No.: US 11,082,270 B1
(45) Date of Patent: Aug. 3, 2021

(54) SIGNAL QUALITY IN RECEIVED WIRELESS SIGNALS IN THE PHASE DOMAIN OF SHIFT KEYING DEMODULATION

(71) Applicant: Amazon Technologies, Inc., Seattle, WA (US)

(72) Inventors: Songping Wu, Palo Alto, CA (US); Sai Prashanth Chinnapalli, Doblin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/745,010

(22) Filed: Jan. 16, 2020

Related U.S. Application Data

(60) Provisional application No. 62/896,976, filed on Sep. 6, 2019.

(51) Int. Cl.
*H04L 27/22* (2006.01)
*H04B 1/30* (2006.01)

(52) U.S. Cl.
CPC ........ *H04L 27/22* (2013.01); *H04B 2001/305* (2013.01)

(58) Field of Classification Search
CPC .......................... H04L 27/22; H04B 2001/305
USPC .................................. 375/319, 332; 370/491
See application file for complete search history.

(56) References Cited

U.S. PATENT DOCUMENTS

| 7,061,997 B1 * | 6/2006 | Eberlein | H04L 27/266 |
| | | | 375/332 |
| 2008/0056305 A1 * | 3/2008 | Medvedev | H04L 27/0014 |
| | | | 370/491 |

* cited by examiner

*Primary Examiner* — Fitwi Y Hailegiorgis
(74) *Attorney, Agent, or Firm* — Lowenstein Sandler LLP (57) ABSTRACT

Technologies directed to improving signal quality in received wireless signals in the phase domain of shift keying demodulation are described. One method receives digital data, the digital data including a systematic error as a linear function of residual carrier frequency offset and phase noise (PN). The method extracts first phase data from the digital data, determines, in a phase domain, an estimate of the systematic error using historical phase error data of additional digital data received prior to the digital data, and generate second phase data by subtracting the estimate from the first phase data. The method determines a set of symbols from the second phase data and generates a bit sequence of a data packet from the set of symbols.

20 Claims, 7 Drawing Sheets

SIGNAL QUALITY IN RECEIVED WIRELESS SIGNALS IN THE PHASE DOMAIN OF SHIFT KEYING DEMODULATION

RELATED APPLICATIONS

This application claims the benefit of Provisional Application No. 62/896,976, filed Sep. 6, 2019, the entire content is hereby incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technologies directed to improving signal quality in received wireless signals in the phase domain of shift keying demodulation are described. Many wired and wireless devices use shift keying modulation and demodulation techniques, such as Frequency Shift Keying (FSK) or Phase Shift Keying (PSK) that are commonly used. Shift keying modulation techniques, like FSK or PSK, bring a low-power design to both transmitter and receiver due to its constant envelopes. It also simplifies and therefore brings a low-cost design with its simple implementation at both ends. Typical examples includes GSM standard with Gaussian FSK (GFSK), Bluetooth standard which adopts GFSK and differential QPSK (DQPSK) and differential 8PSK (8DPSK) for its transmission, and ZigBee with minimum shift keying (MSK, also called OQPSK), which is a variant of FSK modulation.

Conventionally, many demodulation techniques proposed centers around the fact that received signals are differentially demodulated and decision are made upon sliced signals. While this is theoretically true, this differential approach is actually degraded in the presence of both thermal noise and systematic errors caused by radio frequency (RF) impairments, including direct current (DC) offset, carrier frequency offset (CFO), phase noise (PN) and others. This typically leads to a suboptimal performance for FSK or PSK receiver when using differential demodulation. Some RF impairments, caused by shift keying modulation, can behave randomly and are hard to correct. There are also systematic errors resulting from static RF impairments, such as DC offset, or statistically constant, such as mean value of CFO plus PN (CFO+PN). Conventional circuit-level solutions that resort to noise figure reduction to improve the receive signal quality do not fully optimize the systematic error correction to remove static RF impairments.

Aspects of the present disclosure overcome the deficiencies of conventional demodulation techniques by addressing the systematic errors from the phase domain and leveraging high-level information from the established link to provide an intelligent adaptation to improve an estimate accuracy. Aspects of the present disclosure consequently improve the received signal quality by leveraging the good-quality measurement results across multiple data packets associated with a same connection. Aspects of the present disclosure overcome the deficiencies of conventional demodulation techniques by estimating and correcting systematic error in the phase domain and continuing to improve it over multiple data packets using a smoothing algorithm, including as a predictive model that uses historical data collected over multiple data packets. One method receives a data packet including digital data, the digital data including a systematic error as a linear function of residual carrier frequency offset and phase noise (PN). The method extracts first phase data from the digital data, determines, in a phase domain, an estimate of the systematic error using historical phase error data of additional digital data received prior to the digital data, and generate second phase data by subtracting the estimate from the first phase data. The method determines a set of symbols from the second phase data and generates a bit sequence of the data packet from the set of symbols. A transmitting device encodes the bit sequence in a set of transmit signals by modulating the bit sequence. A receiving device receives and detects the set of transmit signals in order to reconstruct the bit sequence. There may be a direct correspondence between a symbol and a small unit of data. For example, each symbol may encode a single bit or multiple bits. The data may also be represented by the transitions between symbols, or even by a sequence of many symbols.

Figure 1:
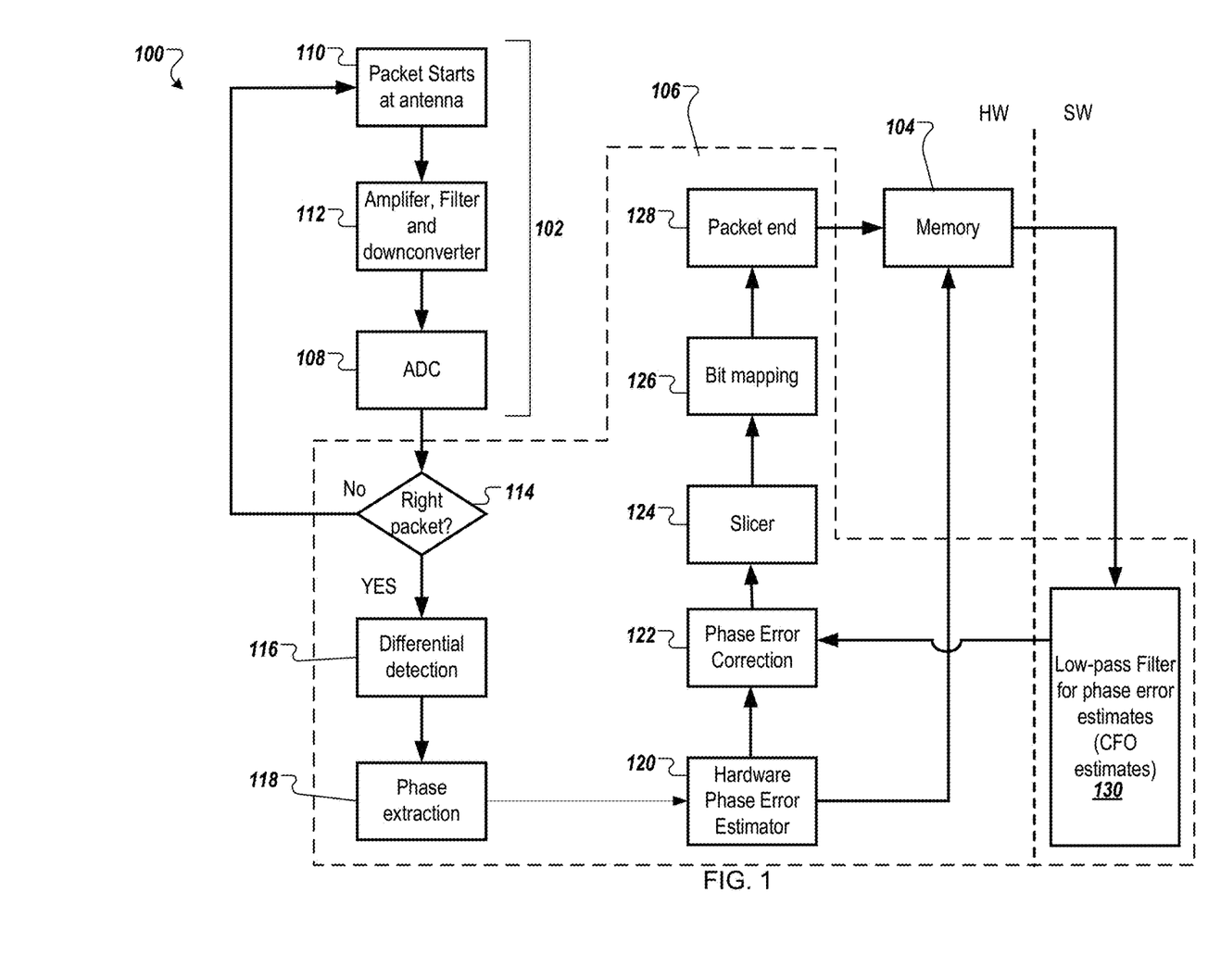
FIG. 1 is a functional diagram of a system with a phase error estimation and correction logic in a feedforward configuration according to one embodiment.

FIG. 1 is a functional diagram of a system 100 with a phase error estimation and correction logic in a feedforward configuration according to one embodiment. The system 100 can be part of a wireless device or an electronic device with a wireless interface. The system 100 can be part of a wired device or an electronic device with a wired interface.

Figure 7A:
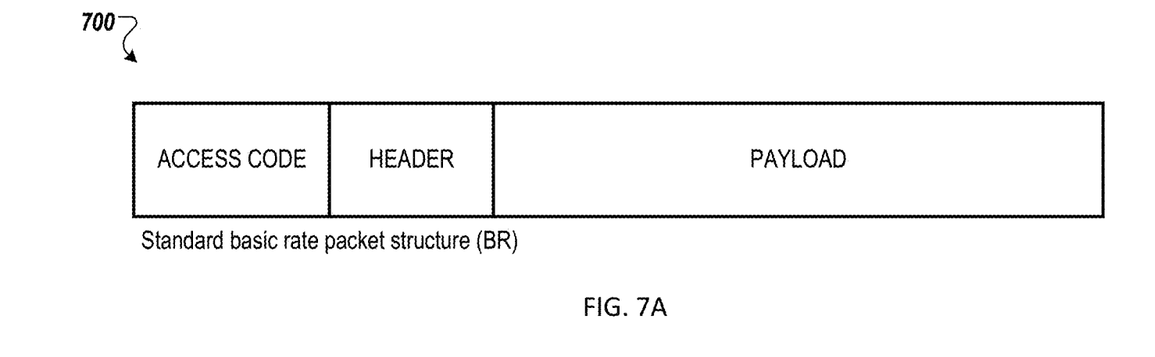
FIG. 7A illustrates a basic rate (BR) packet according to one implementation.
Figure 7B:
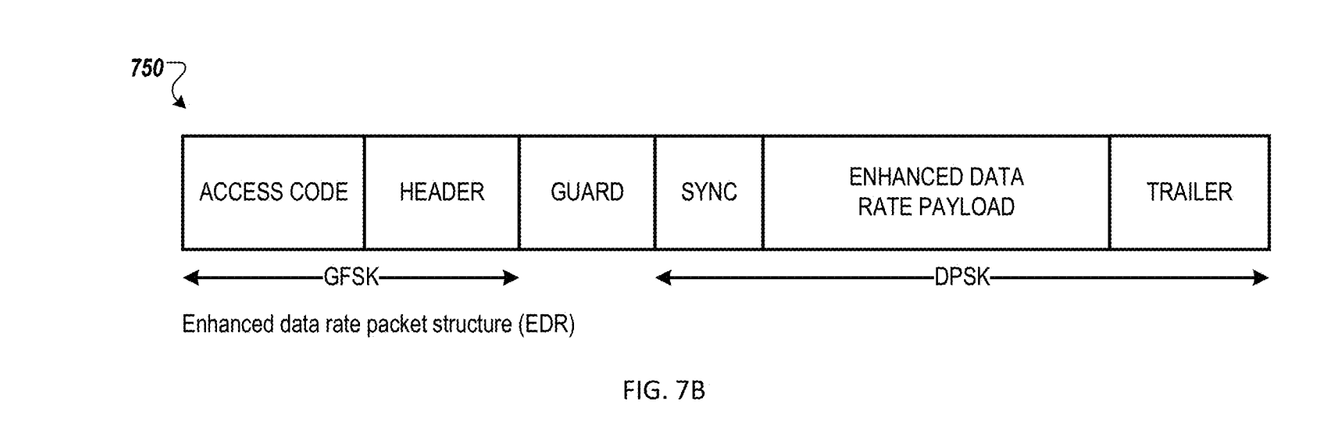
FIG. 7B illustrate an enhanced data rate (EDR) packet according to one implementation.

The system 100 includes radio frequency front-end (RFFE) circuitry 102, a memory device 104, and a processing device 106 coupled to the RFFE circuitry 102 and the memory device 104. The RFFE circuitry 102 is coupled to an antenna and can include various components, including an analog-to-digital converter 108 (ADC). The ADC 108 receives an incoming signal and converts the incoming signal into digital data, such as digital data of a current data packet. The RFFE circuitry 102 can include a carrier frequency offset (CFO) removal circuit that receives the digital signal and generates corrected digital data by removing a CFO from the digital data. The CFO occurs when the digital data is shifted in frequency from a local oscillator signal. The RFFE circuitry 102 can start to receive a current data packet via the antenna (block 110). That is, the RFFE circuitry 102 receives a first RF signal at block 110 and generates a second RF signal by amplifying, filtering, and down-converting a frequency of the first RF signal (block 112). The ADC 108 converts the second RF signal to digital data of the current data packet. In another embodiment, the ADC 108 is part of the processing device 106. The processing device 106 determines whether the current data packet should be decoded (block 114). The processing device 106 can determine that the current data packet is the right current data packet to be decoded when the current data packet is directed to the system 100. For example, the current data packet can include a preamble that can specify a destination address. If the current data packet is not the right packet for the system 100, the current data packet is ignored, returning to block 110. If the current data packet is the right current data packet at block 114, the processing device 106 can perform differential detection. The processing device 106 can include a differential detection circuit that receives the digital data from the RFFE circuitry 102. The differential detection circuit, at block 116, can remove a CFO and outputs output data. The differential digital data includes a systematic error caused by a residual CFO that is a linear function of the CFO and phase noise (PN) in the differential digital data after removing the CFO from the digital data. The processing device 106 can perform phase extraction block 118. The processing device 106 can include a phase extraction circuit that receives the differential digital data from the differential detection circuit. The phase extraction circuit, at block 118, extracts phase data from the differential digital data. The phase extraction circuit outputs the phase data to a hardware phase error estimator circuit 120. The hardware phase error estimator circuit 120 can be part of the phase error estimation and correction logic, as described herein. The hardware phase error estimator circuit 120 receives the phase data from the phase extraction circuit and determines a current phase error estimate for the current data packet. As described below, the current phase error estimate for the current data packet can be stored in the memory device 104. The phase error estimation and correction logic can also include a phase error correction circuit 122 that obtains a historical phase error estimate from the memory device, when available, or the current phase error estimate to adjust the phase data. The phase error correction circuit 122 generates corrected phase data by correcting the phase data, e.g., adding or subtracting the historical phase error estimate from the phase data. The systematic error is removed from the corrected phase data.

The processing device 106 also includes a data slicer 124 that receives the corrected phase data from the phase error correction circuit 122. The data slicer 124 is a component that slices the incoming signal according to a time constant and passes these slices to the bit-mapping circuit 126 for decoding. More specifically, the data slicer 124 takes the received symbol and slices it to QPSK/8PSK symbols on the constellation map. The bit-mapping circuit 126 demaps the QPSK/8PSK symbols on the constellation map to bits. As such, the data slicer 124 receives the corrected phase data as the incoming signal and slices the corrected phase data into a set of symbols. The corrected phase data removes the systematic error before the set of symbols are determined. The processing device 106 also includes a bit-mapping circuit 126 that receives the set of symbols from the data slicer 124 and generates a bit sequence for the current data packet. The bit sequence is a sequence of bits that make up the current data packet. The processing device 106 can determine that the current data packet has been processed (i.e., packet end) (block 128). When the processing device 106 determines the current data packet end, the processing device 106 stores a record in the memory device 104. The record can include the current phase error estimate for the current data packet, which is generated by the hardware phase error estimator circuit 120. The record can also include a source address specified in the current data packet, a current receive signal strength indicator (RSSI) value for the current data packet, and/or a current data packet error rate for the current data packet. A data packet can include an access code, a packet header, and a payload, such as illustrated in a basic rate (BR) packet 700 of FIG. 7A. A data packet can include an access code, a packet header, a guard interval, a synchronization sequence, an enhanced data rate payload, and an optional trailer, such as illustrated in an enhanced data rate (EDR) packet 750 of FIG. 7B. The source address can be part of the access code or the packet header of the BR packet 700 or the EDR packet 750. The packet header can also indicate a length of the payload so that an end of the packet can be determined. The trailer similarly can be used to indicate an end of the data packet.

The processing device 106, the memory device 104, and the RFFE circuitry 102 can be implemented in hardware. The processing device 106 can also execute firmware, software, or any combination thereof to further process the records stored in the memory device 104. For example, the processing device 106 can execute a low-pass filter 130 for phase error estimates (also referred to herein as CFO estimates). The low-pass filter 130 can determine the historical phase error estimate that is loaded by the phase error correction circuit 122, as described above. The low-pass filter 130 can determine the historical phase error estimate by low-pass filtering historical records stored in the memory device 104 using a predictive model, such as using a linear regression function, a recursive function, or the like. In generally, the low-pass filter 130 can be used to cross-check CFO estimates over the same link and linear regression is a practical way to improve the CFO estimates over multiple data packets. As described herein, each record can include a phase error estimate determined for a respective one of one or more packets, the source address specified in the respective packet; a RSSI value for the respective packet, and the packet error rate for the respective packet.

In FIG. 1, the hardware is configured in a feedforward configuration. Alternatively, the hardware can be configured in a feedback configuration, such as illustrated and described with respect to FIG. 2. Alternatively, the system 100 can be combination of both a feedforward and a feedback estimator.

In one embodiment, a received signal is firstly amplified, filtered, down-converted, and digitized from a RF domain to a baseband domain. As noted above, the baseband signal can include many systematic errors inside, where DC offset can be reduced through RF calibration scheme. The digital signal can be further filtered by digital circuits and frequency corrected by a CFO removal circuit before being differentially processed. The digital signal is then differentially processed with the extraction of an angle (e.g., phase data) of the digital signal. As described above, conventionally, the extracted phases serve as the input to a data slicer to determine the symbols. However, this extracted phase, $\theta_i$, I=[1, L], where L is the symbol length for the packet, contains the systematic errors as a linear function of residual CFO (also referred to as phase error). As illustrated in FIG. 1, the extracted phrase is further processed by the hardware phase error estimator circuit 120 and the phase error correction circuit 122 before being input into a data slicer 124. The description below sets forth how a first data packet is processed, as well as how subsequent packets are processed for CFO estimations.

For a first data packet, there may not be any historical data stored in the memory device 104. As such, training symbols, e.g., 64-bit access code symbols, can be used to form a feedforward phase error estimator, as set forth in the following equation (1):

$$\phi^n = F_{off} T_s = \sum_{i=0}^{N} \theta_i \quad (1)$$

$F_{off}$ is the CFO estimate for packet n, which is represented as a phase error $\phi^n$ with sampling period, $T_s$, and $\theta_i$ denotes the phases for access node with i=[1, . . . , 64]. At the end of packet, the estimate $\phi^1$ is obtained for the very first packet, which will be sent to the phase error correction circuit 122.

For the subsequent packet, n, such as from the same connection, the latest phase estimate $\phi^u$ is obtained from the low-pass filter 130 and applied to the current data packet n. It should be noted that although the latest phase estimate $\phi^u$ is obtained from the low-pass filter 130, the hardware phase error estimator circuit 120 can still continue to work and collect a final result as additional input for the low-pass filter 130. That is, the processing device stores the current phase error estimate from the hardware phase error estimator circuit 120 in the memory device 104 at the end of the packet (block 128). Besides the estimate $\phi'$, other info, including RSSI, for the current data packet, can be stored in the memory device 104.

The estimate obtained by the phase error correction circuit 122 is used to correct systematic error in the data payload. The decisions made in payload can be further fed back to continue to improve the estimation (in a feedback loop).

As described herein, the finalized phase estimate, together with other measurements, including source address, signal RSSI, and/or a packet error rate, can be stored in the memory device 104 at the end of a packet (block 128). The end of the packet can be detected by a trailer in the data packet or other indications that the packet has ended. That is, the processing device 106 can obtain a set of measurements from each packet. The low-pass filter 130 can smooth the estimates from the same link, the same wired or wireless connection, or the like. The low-pass filter 130 can be said to be a smoothing filter that has a low-pass effect to remove the errors and noise in the estimate. The low-pass filter 130 can use a predictive model to remove the errors and noise in the estimate. For example, the low-pass filter 130 can directly estimate the CFO estimate by using linear regression (or weighted average) in machine learning with all received N packets, such as set forth in equation (2):

$$\phi^u = \frac{1}{\sum_{n=1}^{N} a_n} \sum_{n=1}^{N} a_n \phi^n, \quad (2)$$

where the weighting coefficient $a_n$ is a function of RSSI, or $a_n = f(RSSI^n)$, for the nth packet. The better RSSI value leads to a higher coefficient. This approach requires the memory device 104 to store the historic records.

In one implementation, the weighting coefficient can be given by the following equation (3):

$$a_n = \max\left(5, U\left(\frac{RSSI_n - R_{thres}}{10}\right)\right), \quad (3)$$

where $R_{thres}$ is a minimum threshold of RSSI that can be used as a weighting coefficient. The minimum threshold is typically a sensitivity level plus an adjustable delta as defined by a solution, or $R_{thres}$=Sen+D, where D is a programmable range from [0, 10]. Function U( ) is the function which takes the closest integer that is bigger or equal to the calculated number.

In another implementation, the weighting coefficient can be given by the following equation (4):

$$a_n = 1 \quad (4)$$

This implementation can be considered an equal-way approach. While this equal-weight approach can lead to a sub-optimal performance, it is effective to simplify the implementation as compared to the dynamic equation described above with respect to equation (3).

The low-pass filter 130 can use a recursive function as the predictive model to remove the errors and noise in the estimate. That is, the CFO estimate improvement can also be done in a recursive way to ensure economic memory consumption using the following equation (5):

$$\phi^u = (1-b_n)\phi^u + b_n\phi^n, \quad (5)$$

where $\phi^u$ indicates the latest phase error estimate, with the initial value set to $\phi^1$ from the first packet for the same link, and $b_n$ is a scalar forgetting factor less than unity and a function of RSSI for the nth packet. The scalar forgetting factor can be a value in the range of [0,1] that is used to update the CFO estimate by weighting two inputs, the historical value in the memory and the current estimate for the current data packet.

In one implementation, the coefficient for the scalar forgetting factor can be given by the following equation (6)

$$b_n = \max\left(5, U\left(\frac{RSSI_n - R_{thres}}{10}\right)\right) / K, \quad (6)$$

where K is a constant adjustable in the silicon, and should be at least 10.

In another implementation, the coefficient for the scalar forgetting factor can be given by the following equation (7):

$$b_n = \delta, \quad (7)$$

where $\delta$ is a fractional positive number that is less than unity, and can be made programmable in the silicon. This also can be considered to be an equal-weight approach. While this equal-weight approach can lead to a sub-optimal performance, it is effective to simplify the implementation as compared to the dynamic equation described above with respect to equation (6).

As described above, he smoothed result from the low-pass filter 130 will be fed back to next packet from the same source for instant error correction. The correction can be given by the following equation (8):

$$\theta_i' = \theta_i - \phi^u \tag{8}$$

In other embodiments, additional parameters than the phase error estimate can be collected and facilitate smoothing by the low-pass filter 130. For example, categorizing the prediction model by its sources and adjusting the weights based on RSSI and a packet error rate measured for this estimate can be done by the firmware. As described above, the hardware in FIG. 1 is configured in a feedforward configuration. The hardware can be configured in a feedback configuration, such as illustrated and described with respect to the system in FIG. 2.

Figure 2:
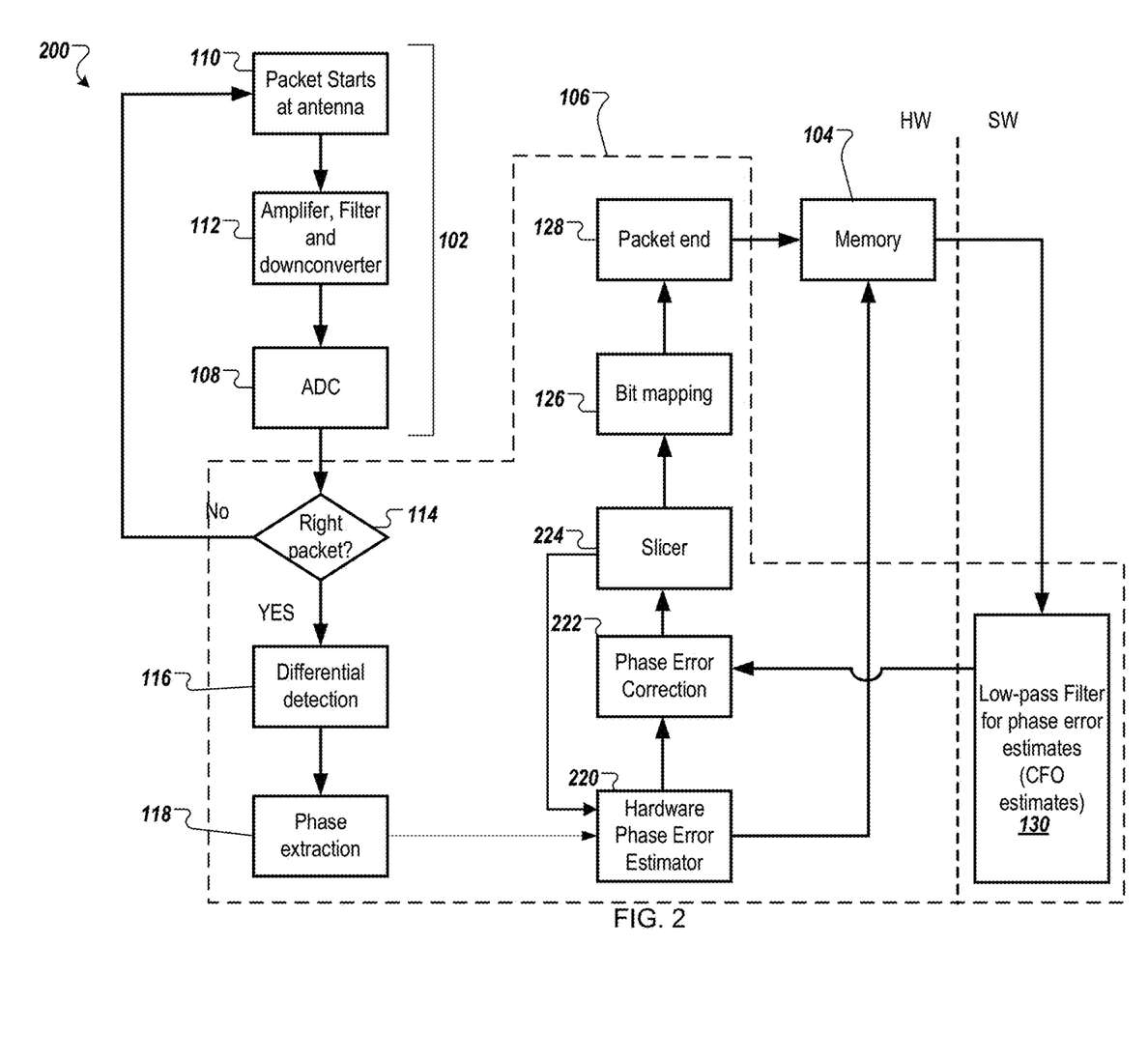
FIG. 2 is a functional diagram of a system with a phase error estimation and correction logic in a feedback configuration according to one embodiment.

FIG. 2 is a functional diagram of a system 200 with a phase error estimation and correction logic in a feedback configuration according to one embodiment. The system 200 is similar to the system 100 as noted by the same reference numbers.

As described above, conventionally, the extracted phases serve as the input to a data slicer to determine the symbols. However, this extracted phase, $\theta_i$, I=[1, L], where L is the symbol length for the packet, contains the systematic errors as a linear function of residual CFO (also referred to as phase error). As illustrated in FIG. 2, the extracted phrase is further processed by a hardware phase error estimator circuit 220 and the phase error correction circuit 222 before being input into a data slicer 224. Unlike the system 100 of FIG. 1, the system 200 of FIG. 2, the hardware phase error estimator circuit 220 and the phase error correction circuit 222 are configured in a feedback configuration. That is, the output of the data slicer 224 can be feedback to the hardware phase error estimator circuit 220 for processing subsequent processing. The following description below sets forth how a first data packet is processed, as well as how subsequent packets are processed for CFO estimations.

For a first data packet, there may not be any historical data stored in the memory device 104. As such, training symbols, e.g., 64-bit access code symbols, can be used to form a feedback phase error estimator. The feedback phase error estimator can be another option using decision errors, where the averages go over phases with i=[64, . . . , L]. The estimation is done by comparing the sliced symbol with its original, and averaging it over all training symbols. At the end of packet, the estimate $\phi^1$ is obtained for the very first packet which will be sent to the phase error correction circuit 122.

Figure 3:
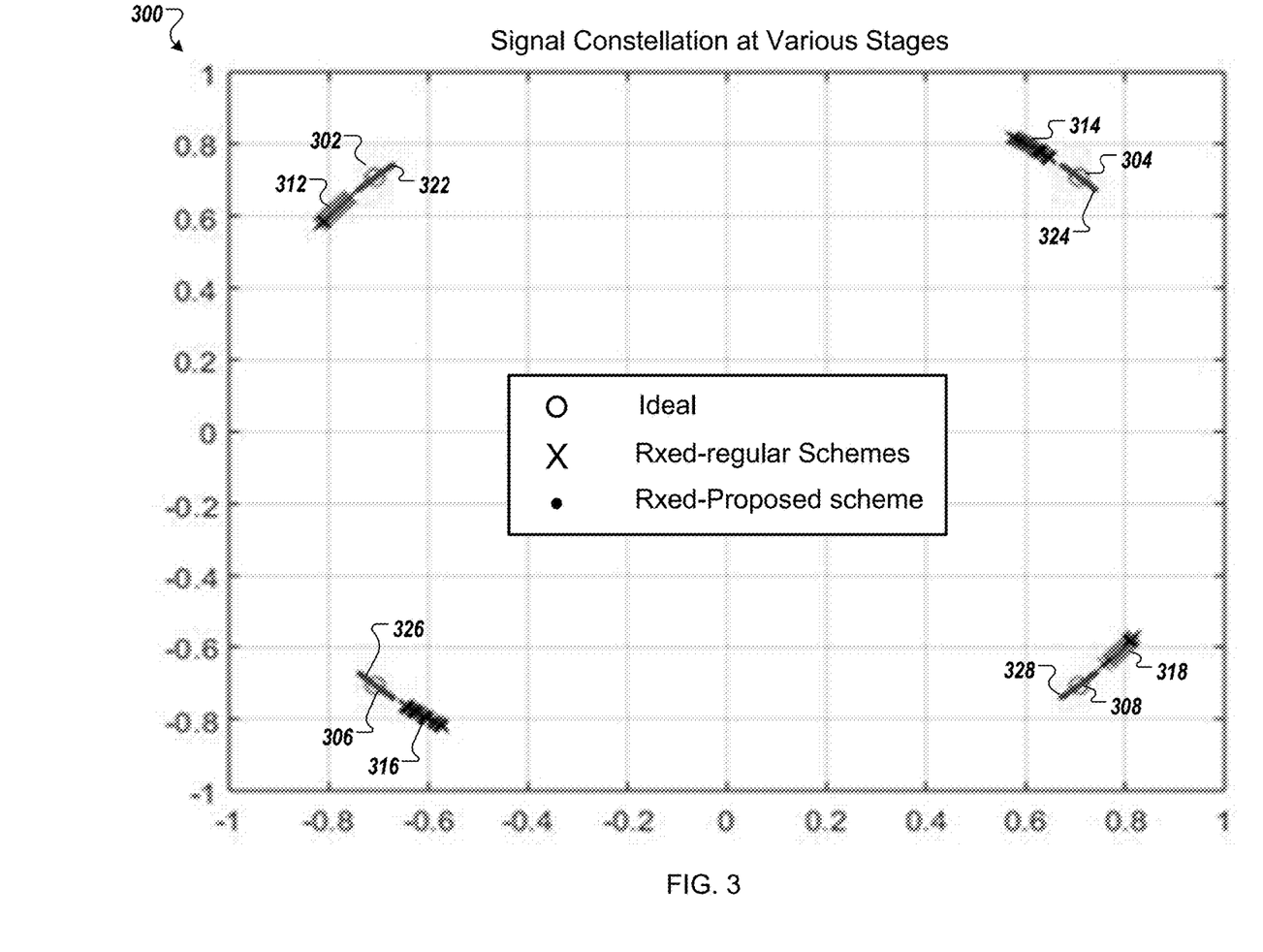
FIG. 3 is a signal constellation graph with results from a conventional system and a system with the phase error estimation and correction logic according to one embodiment.

FIG. 3 is a signal constellation graph 300 with results from a conventional system and a system with the phase error estimation and correction logic according to one embodiment. The graph 300 includes ideal coordinates for a first symbol 302, ideal coordinates for a second symbol 304, ideal coordinates for a third symbol 306, and ideal coordinates for a fourth symbol 308. As shown in FIG. 3, the results for the conventional system have systematic errors that shift results 312 down and to the left for the first symbol 302, results 314 up and to the left for the second symbol 304, results 316 down and to the right for the third symbol 306, and results 318 up and to the right for the fourth symbol 308. In contrast, the results of a system with the phase error estimation and correction logic have the systematic error removed. As shown, results 322 are centered about the coordinates of the first symbol 302, results 324 are centered about the coordinates of the second symbol 304, results 326 are centered about the coordinates of the third symbol 306, and results 328 are centered about the coordinates of the fourth symbol 308. It should be noted that the results 322-328 can still include errors, but the errors are not caused by the systematic errors that have been removed. It should also be noted that these errors are less than the errors of the results 312-318. The reduction in errors in the phase data leads to better determinations of symbols, resulting in less errors in the bit sequences of the packets.

Figure 4:
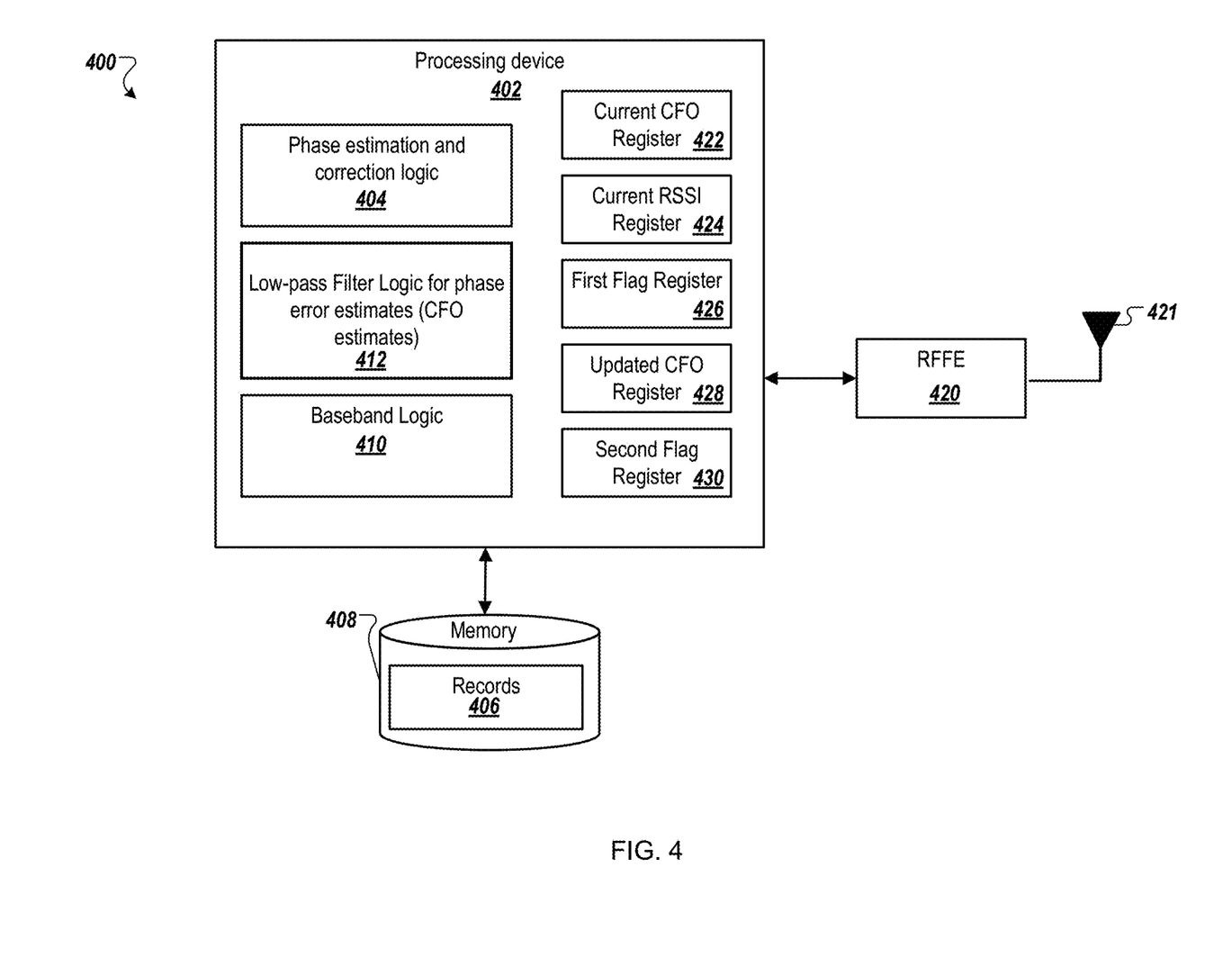
FIG. 4 is a block diagram of a wireless device with phase estimation and correction logic according to one embodiment.

FIG. 4 is a block diagram of a wireless device 400 with phase estimation and correction logic according to one embodiment. In the depicted embodiment, the wireless device 400 includes radio frequency front-end (RFFE) circuitry 420 that is coupled to one or more antenna(s) 420. The RFFE circuitry 420 can include an analog-to-digital converter (ADC) that converts RF signals, received via the one or more antennas 421, to digital data of one or more packet. The system 100 also includes a memory device 408 and a processing device 402 coupled to the RFFE circuitry 420 and the memory device 408.

As described above with respect to FIGS. 1-2, the processing device 402 can include a differential detection circuit, a phase extraction circuit, phase estimation and correction logic 404, a s data slicer, and a bit-mapping circuit. The differential detection circuit that receives the digital data from the RFFE circuitry. The differential detection circuit can remove a CFO and outputs output data. The digital data includes a systematic error as a linear function of residual CFO. The phase extraction circuit receives the output data from the differential detection circuit and extracts phase data from the output data. The phase estimation and correction logic 404 can receive the phase data from the phase extraction circuit and can determine a current phase error estimate for the packet. In some cases, the phase estimation and correction logic 404 can load a historical phase error estimate. The phase estimation and correction logic 404 generates corrected phase data by correcting the phase data by the historical phase error estimate. The data slicer can receive the corrected phase data from the phase estimation and correction logic and determine a set of symbols from the corrected phase data. The bit-mapping circuit receives the set of symbols and generates a bit sequence for the packet. As described herein, the phase estimation and correction logic 404 can store one or more records 406 in the memory device 408. Each record can include data or information about the current phase error estimate for the packet, a link identifier (e.g., a source address specified in the packet or source and destination addresses specified in the packet); a current RSSI value for the packet, and a current data packet error rate for the packet. An example of one of the records 406 is set forth in Table 1.

TABLE 1

| Link ID | Current Phase Error Estimate | Current RSSI value | Current data packet Error Rate |
| --- | --- | --- | --- |
| 000666422152 (48-bit address (BD_ADDR)) | −10 | −95 | .01 |

In one embodiment, the processing device has low-pass filter logic 412 that can determine the historical phase error estimate by low-pass filtering phase error estimates stored in the historical records 406 stored in the memory device 408.

The low-pass filter logic 412 can be implemented in firmware executed by the processing device. Alternatively, the low-pass filter logic 412 can be implemented in other manners. The low-pass filter logic 412 can determine the historical phase error estimate by low-pass filtering phase error estimates stored in the historical records 406 using a linear regression function. Each of the historical records 406 can include a phase error estimate determined for a second data packet that is received prior to the data packet, the source address specified in the second data packet; a RSSI value for the second data packet, and a packet error rate for the second data packet. In another embodiment, the low-pass filter logic 412 that can determine the historical phase error estimate by low-pass filtering phase error estimates stored in the historical records 406 using a recursive function. Similarly, each of the historical records 406 can include a phase error estimate determined for a second data packet, the source address specified in the second data packet; a RSSI value for the second data packet, and the packet error rate for the second data packet.

In a further embodiment, the processing device 402 includes multiple registers, including, for example: i) a multi-bit register 422 for the baseband circuitry (including the phase estimation and correction logic 404 and the baseband circuitry) to write a current estimated CFO value (phase error estimate) at the end of packet so that the low-pass filter logic 412 (e.g., firmware) can read it later for processing and resetting this register; ii) a multi-bit register 424 for the baseband circuitry to write a current estimated RSSI at the end of packet so that the low-pass filter logic 412 (e.g., firmware) can read it later for processing and resetting this register; iii) a one-bit first flag register 426 for the baseband circuitry to write a one-bit flag to indicate if the CFO value and RSSI value in the aforementioned registers are valid so that the low-pass filter logic 412 (e.g., firmware) can understand if it needs to fetch the CFO value and the RSSI value for this packet; iv) a multi-bit register 428 that is updated by the low-pass filter logic 412 (e.g., firmware) so that baseband circuitry can load an updated CFO value (historical phase error estimate); and v) a one-bit second flag register 430 that is written by the low-pass filter logic 412 (e.g., firmware) for the baseband circuitry to understand if the updated CFO value in the register 428 is valid or not before it fetches the updated CFO value. If the updated CFO value is valid, then the baseband circuitry should load, from the register 428, the updated CFO estimate for packet processing. Otherwise, it will continue with its own estimate stored in the register 422.

It should be noted that once the low-pass filter logic 412 (e.g., firmware) is done with reading the current CFO value and the RSSI value from the registers 422, 424, the low-pass filter logic 412 (e.g., firmware) can reset the registers 422, 424. Also, once the baseband circuitry identifies a valid packet at the end of the preamble, it can apply the updated CFO value from the register 428 for packet header/payload demodulation and can stop using its existing on-the-fly CFO estimate stored in the register 422.

It should also be noted that the memory device 408 that buffers a number, N, of updated CFO/RSSI estimates as historical records 406. These estimates can be grouped by link identifier (link ID) and device identifier (device ID), for example. For example, the estimates for mobile phone 1, mobile phone 2, and mobile phone M, can be grouped according to media access control (MAC) addresses accordingly. The memory device 408 can include sufficient memory (RAM) space of N×M records of CFO estimates and RSSI estimates.

As described above, the baseband circuitry (e.g., 404, 410) can write CFO/RSSI estimates to the registers 422, 424, write valid indicators to the register 426. The base circuitry can read the CFO/RSSI estimates from the registers 422, 424, as well as the updated CFO estimates from the register 428. The baseband circuitry can include logic to determine if the receiver should go ahead and adopt to the updated CFO estimate for packet header/payload processing. The baseband circuitry can also include logic for bypassing the active CFO estimate and compensation logic all together and using the CFO estimate with a constant value from the register 428.

The low-pass filter logic 412 can perform some algorithm, as described herein, to smooth the N records of CFO and RSSIs from a certain link. The low-pass filter logic 412 can track and determine if any single record of CFO estimate is an outliner and remove it from smoothing process. The low-pass filter logic 412 can maintain all the updated CFOs in the memory device 408. The low-pass filter logic 412 can determine the link ID and write associated updated CFO to the register for the baseband circuitry to read. The low-pass filter logic 412 can include a function to erase the existing and updated estimate per request. The low-pass filter logic 412 can include a function to track packet error rate and audio quality statistics to understand the effect of using the updated CFO. The low-pass filter logic 412 can include a function to force the baseband circuitry to adopt the updated CFO when requested.

Figure 5:
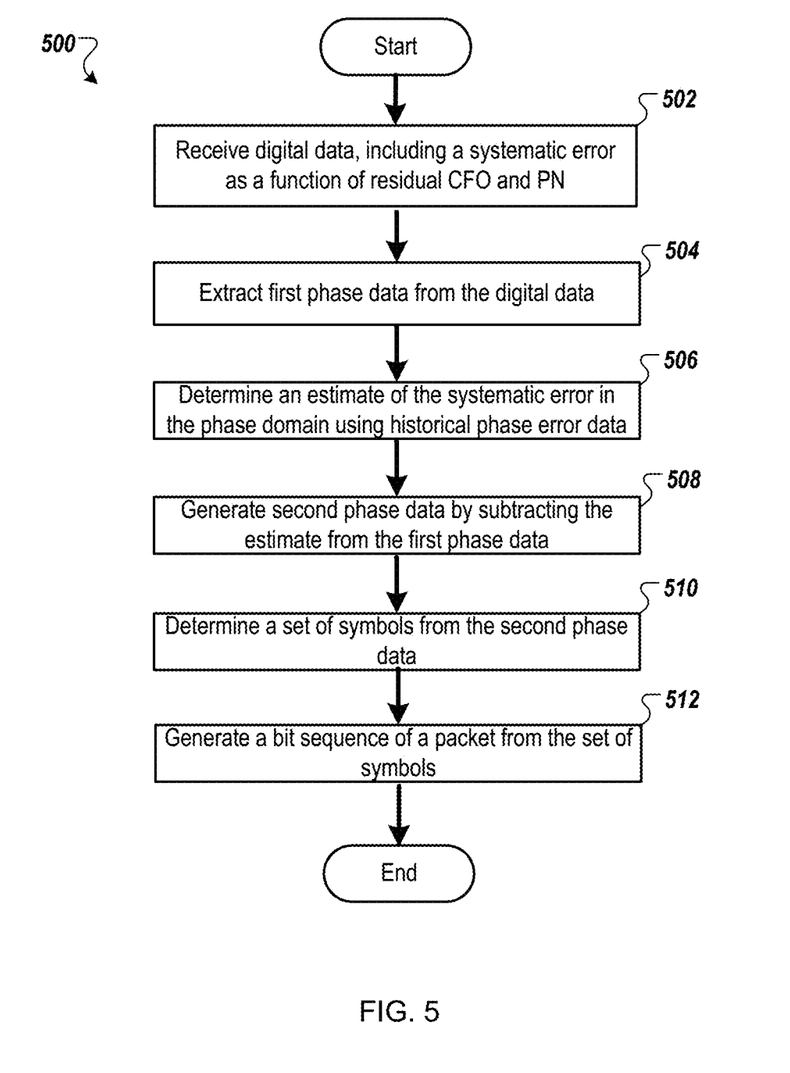
FIG. 5 is a flow diagram of a method of estimating and correcting phase errors according to one embodiment.

FIG. 5 is a flow diagram of a method of estimating and correcting phase errors according to one embodiment. The method 500 may be performed by processing logic that comprises hardware (e.g., circuitry, dedicated logic, programmable logic, microcode, etc.), software, firmware, or a combination thereof. In one embodiment, the method 500 may be performed by any of the processing devices described herein and illustrated with respect to FIGS. 1-4.

Referring back to FIG. 5, the method 500 begins by the processing logic by receiving a data packet including digital data (block 502). The digital data comprises a systematic error as a linear function of residual CFO and PN. The processing logic extracts first phase data from the digital data (block 504). The processing logic determines an estimate of the systematic error in the phase domain using a predictive model of historical phase error data of other packets; (block 506). The processing logic generates second phase data by subtracting the estimate from the first phase data (block 508). The processing logic determines a set of symbols from the second phase data (block 510). The processing logic generates a bit sequence of a data packet from the set of symbols (block 512), and the method 500 ends.

In a further embodiments, the processing logic determines a source address specified in the packet and a receive signal strength indicator (RSSI) value for the packet. The processing logic stores, in a memory device, a record including the estimate of the systematic error for the packet, the source address specified in the packet, and the RSSI value. In a further embodiments, the processing logic determines a packet error rate for the packet. The processing logic stores a record including the estimate of the systematic error for the packet, the source address specified in the packet, the RSSI value, and the packet error rate. The processing logic can determine the estimate of the systematic error by determining the estimate of the systematic error using the historical phase error data and historical packet error rates for the additional digital data received prior to the digital data.

In a further embodiments, the processing logic receives a first RF signal and generates a second RF signal by amplifying, filtering, and down-converting a frequency of the first RF signal. The processing logic converts the second RF signal to the digital data of the packet. The packet can include a preamble that specifies a source address and a destination address. The processing logic determines, from the preamble, that the packet is to be decoded by the processing logic. That is, the processing logic can determine that the packet ha a destination address for the wireless device containing the processing logic. Once the processing logic determines that the packet is to be decoded, the processing logic extracts the first phase data from the output data by differential processing of the packet.

In one embodiment, the processing logic determines the set of symbols using a data slicer and generates the bit sequence using a bit-mapping circuit.

In a further embodiments, the processing logic detects an end of the packet. The processing logic determines a source address specified in the packet, determines RSSI value for the packet, and stores, in a memory device, a record including the estimate of the systematic error for the packet, the source address specified in the packet, and the RSSI value, responsive to the detecting the end of the packet.

In a further embodiments, the processing logic determines that the packet is a first packet of multiple data packets exchanged in a communication on a connection between the processing device and a second device. The processing logic, to determine the estimate, calculates the estimate using a feedforward phase error estimation equation using a training symbol. Alternatively, the processing logic determines that the packet is not the first packet of the multiple data packets in the communication on the connection. To determine the estimate, the processing logic applies a historical estimate as the estimate and calculates a current estimate using the feedforward phase error estimation equation.

In another embodiments, the processing logic determines that the packet is a first packet in a communication on a connection between the processing device and a second device. The processing logic, to determine the estimate, calculates the estimate using a feedback phase error estimation equation using a set of training symbols. This can be done by comparing a sliced symbol with an original symbol to obtain a decision error value and averaging the decision error value over all training symbols to obtain the estimate. Alternatively, the processing logic determines that the packet is not the first data packet in the communication on the connection. To determine the estimate, the processing logic applies a historical estimate as the estimate and calculates a current estimate using the feedback phase error estimation equation.

In one embodiment, the predictive model is a linear regression model. In this embodiment, in order to determine the estimate, the processing logic calculates the estimate from the historical phase error data using a weighted average equation with a weighting coefficient that is a function of RSS. In a further embodiments, the processing logic determines an estimate of the systematic error for each of the other packets, determines a RSSI value for each of the other packets, determines a packet error rate for each of the other packets, and stores, in a memory device, a record for each of the other packets. Each of the records includes the estimate of the systematic error for the respective packet, the respective RSSI value for the respective packet, and the respective packet error rate for the respective packet. The processing logic can adjust the weighting coefficient of the weighted average equation based on at least RSSI or packet error rate. In another embodiment, in order to determine the estimate, the processing logic calculates the estimate from the historical phase error data using a weighted average equation with a weighting coefficient that is fixed. This is referred to as the equal-weight approach as described herein.

In another embodiment, the predictive model is a recursive model. In this embodiment, in order to determine the estimate, the processing logic calculates the estimate from the historical phase error data using a recursive equation with a scalar forgetting factor coefficient that is a function of RSSI. In a further embodiment, the processing logic determines an estimate of the systematic error for each of the other packets, determines a RSSI value for each of the other packets, determines a packet error rate for each of the other packets, and stores, in a memory device, a record for each of the other packets. Each of the records includes the estimate of the systematic error for the respective packet, the respective RSSI value for the respective packet, and the respective packet error rate for the respective packet. The processing logic can adjust the scalar forgetting factor coefficient of the recursive equation based on at least RSSI or packet error rate. In another embodiment, in order to determine the estimate, the processing logic calculates the estimate from the historical phase error data using a recursive equation with a scalar forgetting factor coefficient that is fixed. This is referred to as the equal-weight approach as described herein.

Figure 6:
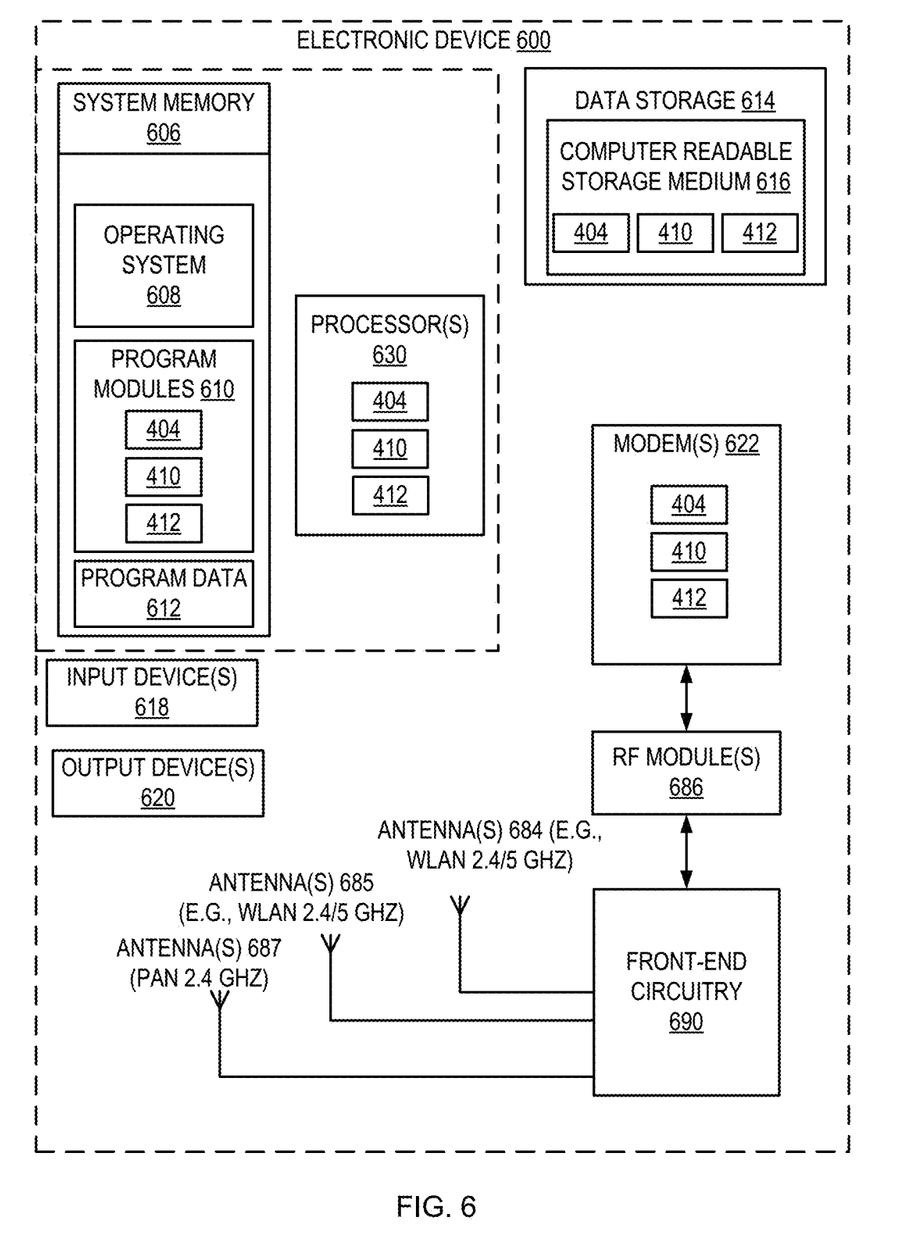
FIG. 6 is a block diagram of an electronic device that can be configured to estimate and correct a phase error as described herein according to one embodiment.

FIG. 6 is a block diagram of an electronic device 600 that can be configured to estimate and correct a phase error as described herein according to one embodiment. The electronic device 600 may correspond to the electronic devices described above with respect to FIGS. 1-5. In one embodiment, the electronic device 600 is the system 100 of FIG. 1. In another embodiment, the electronic device 600 is the system 200 of FIG. 2. In one embodiment, the electronic device 600 is the processing device 402 of FIG. 4 or the wireless device 400 of FIG. 4. Alternatively, the electronic device 600 may be other electronic devices, as described herein.

The electronic device 600 includes one or more processor(s) 630, such as one or more CPUs, microcontrollers, field programmable gate arrays, or other types of processors. The electronic device 600 also includes system memory 606, which may correspond to any combination of volatile and/or non-volatile storage mechanisms. The system memory 606 stores information that provides operating system component 608, various program modules 610, program data 612, and/or other components. In one embodiment, the system memory 606 stores instructions of methods to control operation of the electronic device 600. The electronic device 600 performs functions by using the processor(s) 630 to execute instructions provided by the system memory 606. In one embodiment, the program modules 610 may include phase estimation and correction logic 404 that may perform some or all of the operations described herein, such as the method 500 of FIG. 4, or any processes described herein. The phase estimation and correction logic 404 may perform some or all of the operations described herein to estimate and correct a phase error. The program modules 610 may also include the low-pass filter logic 412 for phase error estimates (CFO estimates), the baseband logic 410, or any combination thereof.

The electronic device 600 also includes a data storage device 614 that may be composed of one or more types of removable storage and/or one or more types of non-removable storage. The data storage device 614 includes a computer-readable storage medium 616 on which is stored one or more sets of instructions embodying any of the methodologies or functions described herein. Instructions for the program modules 610 (e.g., phase estimation and correction logic 404, low-pass filter logic 412, baseband logic 410, or any combination thereof) may reside, completely or at least partially, within the computer-readable storage medium 616, system memory 606 and/or within the processor(s) 630 during execution thereof by the electronic device 600, the system memory 606 and the processor(s) 630 also constituting computer-readable media. The electronic device 600 may also include one or more input devices 618 (keyboard, mouse device, specialized selection keys, etc.) and one or more output devices 620 (displays, printers, audio output mechanisms, etc.).

The electronic device 600 further includes a modem 622 to allow the electronic device 600 to communicate via a wireless connections (e.g., such as provided by the wireless communication system) with other computing devices, such as remote computers, an item providing system, and so forth. The modem 622 can be connected to one or more radio frequency (RF) modules 686. The RF modules 686 may be a WLAN module, a WAN module, wireless personal area network (WPAN) module, Global Positioning System (GPS) module, or the like. The antenna structures (antenna(s) 684, 685, 687) are coupled to the front-end circuitry 690, which is coupled to the modem 1022. The front-end circuitry 690 may include radio front-end circuitry, antenna switching circuitry, impedance matching circuitry, or the like. The antennas 684 may be GPS antennas, Near-Field Communication (NFC) antennas, other WAN antennas, WLAN or PAN antennas, or the like. The modem 622 allows the electronic device 600 to handle both voice and non-voice communications (such as communications for text messages, multimedia messages, media downloads, web browsing, etc.) with a wireless communication system. The modem 622 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 622 may generate signals and send these signals to antenna(s) 684 of a first type (e.g., WLAN 5 GHz), antenna(s) 685 of a second type (e.g., WLAN 2.4 GHz), and/or antenna(s) 687 of a third type (e.g., WAN), via front-end circuitry 690, and RF module(s) 686 as descried herein. Antennas 684, 685, 687 may be configured to transmit in different frequency bands and/or using different wireless communication protocols. The antennas 684, 685, 687 may be directional, omnidirectional, or non-directional antennas. In addition to sending data, antennas 684, 685, 687 may also receive data, which is sent to appropriate RF modules connected to the antennas. One of the antennas 684, 685, 687 may be any combination of the antenna structures described herein.

In one embodiment, the electronic device 600 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 622 is shown to control transmission and reception via antenna (684, 685, 687), the electronic device 600 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
    radio frequency front-end (RFFE) circuitry comprising:
        an analog-to-digital converter (ADC) that receives an incoming signal and converts the incoming signal into digital data; and
        a carrier frequency offset (CFO) removal circuit that receives the digital data and generates corrected digital data by removing a CFO from the digital data, the CFO occurring when the digital data is shifted in frequency from a local oscillator signal;
    a memory device; and
    a processing device coupled to the RFFE circuitry and the memory device, wherein the processing device comprises:
        a differential detection circuit that receives the corrected digital data from the RFFE circuitry and generates differential digital data from the corrected digital data, wherein the differential digital data includes a systematic error caused by a residual CFO that is a linear function of the CFO and phase noise (PN) in the differential digital data after removing the CFO from the digital data;
        a phase extraction circuit that receives the differential digital data from the differential detection circuit and extracts phase data from the differential digital data;
        phase estimation and correction logic that receives the phase data from the phase extraction circuit, determines a current phase error estimate for a current data packet, obtains a historical phase error estimate from the memory device, and generates corrected phase data by adding or subtracting the historical phase error estimate from the phase data, wherein the systematic error is removed from the corrected phase data;
        a data slicer that receives the corrected phase data from the phase estimation and correction logic and determines a set of symbols from the corrected phase data; and
        a bit-mapping circuit that receives the set of symbols and generates a sequence of bits for the current data packet from the set of symbols,
    wherein the phase estimation and correction logic further stores a record in the memory device, the record comprising the current phase error estimate for the current data packet, a source address specified in the current data packet, a current receive signal strength indicator (RSSI) value for the current data packet, and a current data packet error rate for the current data packet.

2. The wireless device of claim 1, wherein the processing device executes firmware that determines the historical phase error estimate by low-pass filtering historical phase error estimates, which are stored in records in the memory device, using a linear regression function, wherein each of the records comprises a phase error estimate determined for a data packet received prior to the current data packet, a source address specified in the data packet, a RSSI value for the data packet, and a packet error rate for the data packet.

3. The wireless device of claim 1, wherein the processing device executes firmware that determines the historical phase error estimate by low-pass filtering phase error estimates, which are stored in records in the memory device, using a recursive function, wherein each of the records comprises a phase error estimate determined for a data packet received prior to the current data packet, a source address specified in the data packet, a RSSI value for the data packet, and a packet error rate for the data packet.

4. A method comprising:
    receiving, by a processing device, digital data, wherein the digital data comprises a systematic error as a linear function of residual carrier frequency offset (CFO) and phase noise (PN);
    extracting, by the processing device, first phase data from the digital data;
    determining, by the processing device in a phase domain, an estimate of the systematic error in the digital data using historical phase error data of additional digital data received prior to the digital data, wherein determining the estimate further comprises filtering the historical phase error data to remove an error in the estimate;
    generating, by the processing device, second phase data by adding or subtracting the estimate from the first phase data;
    determining, by the processing device, a set of symbols from the second phase data; and
    generating, by the processing device, a bit sequence of a data packet from the set of symbols.

5. The method of claim 4, further comprising:
    determining, by the processing device, a source address specified in the data packet;
    determining, by the processing device, a receive signal strength indicator (RSSI) value for the data packet; and
    storing, by the processing device in a memory device, a record comprising the estimate of the systematic error for the data packet, the source address specified in the data packet, and the RSSI value.

6. The method of claim 5, further comprising:
    determining, by the processing device, a packet error rate for the data packet, wherein storing the record comprises storing the record comprising the estimate of the systematic error for the data packet, the source address specified in the data packet, the RSSI value, and the packet error rate, and wherein determining the estimate of the systematic error further comprises determining the estimate of the systematic error using the historical phase error data and historical packet error rates for the additional digital data received prior to the digital data.

7. The method of claim 4, further comprising:
receiving a first radio frequency (RF) signal;
generating a second RF signal by amplifying, filtering, and down-converting a frequency of the first RF signal; and
converting the second RF signal to the digital data, wherein the data packet comprises a preamble that specifies a source address, and wherein extracting the first phase data from the digital data by differential processing the digital data.

8. The method of claim 4, further comprising:
detecting, by the processing device, an end of the data packet;
determining, by the processing device, a source address specified in the data packet;
determining, by the processing device, a receive signal strength indicator (RSSI) value for the data packet; and
storing, by the processing device in a memory device, a record comprising the estimate of the systematic error for the data packet, the source address specified in the data packet, and the RSSI value, responsive to the detecting the end of the data packet.

9. The method of claim 4, further comprising:
determining, by the processing device, that the data packet is a first data packet of a plurality of data packets exchanged between the processing device and a second device, wherein the determining the estimate comprises calculating the estimate using a set of training symbols before the historical phase error data is stored; or
determining, by the processing device, that the data packet is not the first data packet of the plurality of data packets;
storing, by the processing device in a memory device, a record with the estimate responsive to determining that the data packet is not the first data packet;
obtaining, by the processing device from the memory device, a historical estimate responsive to determining that the data packet is not the first data packet; and
assigning, by the processing device, the historical estimate as the estimate for the generating the second phase data.

10. The method of claim 4, further comprising:
determining, by the processing device, that the data packet is a first data packet of a plurality of data packets exchanged between the processing device and a second device, wherein the determining the estimate comprises calculating the estimate using a set of training symbols before the historical phase error data is stored and feeding back the estimate to calculate a next estimate for a third data packet that is received after the first data packet; or
determining, by the processing device, that the data packet is not a first data packet of the plurality of data packets;
obtaining, by the processing device, a second estimate from a second data packet responsive to determining that the data packet is not the first data packet, wherein the determining the estimate further comprises using the second estimate; and
storing, by the processing device in a memory device, a record with the estimate responsive to determining that the data packet is not the first data packet.

11. The method of claim 4, wherein determining the estimate further comprises computing the estimate using a linear regression model on the historical phase error data and receive signal strength indicator (RSSI) values.

12. The method of claim 11, further comprising:
determining, by the processing device, an estimate of the systematic error for each packet of the additional digital data received prior to the digital data;
determining, by the processing device, a RSSI value for each packet of the additional digital data;
determining, by the processing device, a packet error rate for each packet of the additional digital data;
storing, by the processing device in a memory device, a record for each packet of the additional digital data, each of the records comprising the estimate of the systematic error for the respective packet, the respective RSSI value for the respective packet, and the respective packet error rate for the respective packet; and
adjusting a weighting coefficient of the linear regression model based on at least RSSI or a packet error rate.

13. The method of claim 4, wherein determining the estimate further comprises computing the estimate using a linear regression model on the historical phase error data and with a weighting coefficient that is fixed.

14. The method of claim 4, wherein determining the estimate further comprises computing the estimate using a recursive model on the historical phase error data and receive signal strength indicator (RSSI) values.

15. The method of claim 14, further comprising:
determining, by the processing device, an estimate of the systematic error for each packet of the additional digital data received prior to the digital data;
determining, by the processing device, a RSSI value for each packet of the additional digital data;
determining, by the processing device, a packet error rate for each packet of the additional digital data;
storing, by the processing device in a memory device, a record for each packet of the additional digital data, each of the records comprising the estimate of the systematic error for the respective packet, the respective RSSI value for the respective packet, and the respective packet error rate for the respective packet; and
adjusting a scalar forgetting factor coefficient of the recursive model based on at least RSSI or a packet error rate.

16. The method of claim 4, wherein determining the estimate further comprises computing the estimate using a recursive model on the historical phase error data and with a scalar forgetting factor coefficient that is fixed.

17. A wireless device comprising:
radio frequency front-end (RFFE) circuitry;
a memory device; and
a processing device coupled to the RFFE circuitry and the memory device, wherein the processing device comprises:
a differential detection circuit to receive first digital data and generate second digital data by removing a carrier frequency offset (CFO), wherein the second digital data includes a systematic error caused by a residual CFO that is a linear function of the CFO and phase noise (PN);
a phase extraction circuit to receive second digital data from the differential detection circuit and extract first phase data from the second digital data;
phase estimation and correction logic to:
receive the first phase data from the phase extraction circuit;
determine a current phase error estimate for a first data packet; and generate second phase data by subtracting a historical phase error estimate from the first phase data;

a data slicer to receive the second phase data from the phase estimation and correction logic and determine a set of symbols from the second phase data; and a bit-mapping circuit to receive the set of symbols from the data slicer and generate a bit sequence for the first data packet, wherein the phase estimation and correction logic is further to store a record in the memory device, the record comprising the current phase error estimate for the first data packet and a current receive signal strength indicator (RSSI) value for the first data packet.

18. The wireless device of claim 17, wherein the processing device is further to execute firmware to determine the historical phase error estimate by low-pass filtering phase error estimates, which are stored in records in the memory device, using a linear regression function or a recursive function, wherein each of the records comprises a phase error estimate determined for a data packet received prior to the first data packet and at least one of a source address specified in the data packet, a RSSI value for the data packet, or a packet error rate for the data packet.

19. The wireless device of claim 17, wherein the processing device is further to:

receive a first radio frequency (RF) signal via the RFFE circuitry;

generate a second RF signal by amplifying, filtering, and down-converting a frequency of the first RF signal; and convert the second RF signal to the first digital data, wherein the first data packet comprises a preamble that specifies a source address and a destination address, and wherein the processing device is to extract the first phase data from the second digital data by differential processing the second digital data.

20. The wireless device of claim 17, wherein the processing device is further to:

determine that the first data packet is a first one of a plurality of data packets exchanged between the processing device and a second device;

calculate the current phase error estimate using a set of training symbols before the historical phase error estimate is stored responsive to determining that the first data packet is the first one of the plurality of data packets; and store, in the memory device, the record with the current phase error estimate responsive to determining that the first data packet is the first one of the plurality of data packets; or determine that the first data packet is not the first one of the plurality of data packets;

store, in the memory device, the record with the current phase error estimate responsive to determining that the first data packet is not the first one of the plurality of data packets;

obtaining, by the processing device from the memory device, a historical estimate responsive to determining that the first data packet is not the first one of the plurality of data packets; and assigning, by the processing device, the historical estimate as the current phase error estimate before the processing device is to generate the second phase data, responsive to determining that the first data packet is not the first one of the plurality of data packets.

* * * * *